United States Patent [19]
Lucas et al.

[11] Patent Number: 5,311,359
[45] Date of Patent: May 10, 1994

[54] REFLECTIVE OPTICAL CORRELATOR WITH A FOLDED ASYMMETRICAL OPTICAL AXIS

[75] Inventors: John R. Lucas, Glendale; Andrew M. Pollack, Simi Valley; Stuart A. Mills, West Hills, all of Calif.

[73] Assignee: Litton Systems, Inc., Beverly Hills, Calif.

[21] Appl. No.: 996,584

[22] Filed: Dec. 24, 1992

[51] Int. Cl.$^5$ .................. G02B 27/46; G06K 9/64
[52] U.S. Cl. .................... 359/561; 359/559; 382/42; 382/31
[58] Field of Search ............... 359/561, 559; 382/42, 382/31

[56] References Cited

U.S. PATENT DOCUMENTS

| | | | |
|---|---|---|---|
| 4,941,719 | 7/1990 | Hisada et al. | 359/217 |
| 4,968,136 | 11/1990 | Lim et al. | 359/282 |
| 5,148,496 | 7/1992 | Anderson | 359/561 |
| 5,216,541 | 6/1993 | Takasue et al. | 359/559 |

Primary Examiner—Bruce Y. Arnold
Assistant Examiner—Thomas D. Robbins
Attorney, Agent, or Firm—Donald J. Ellingsberg

[57] ABSTRACT

An optical correlator system having a plurality of reflective optical components, both active and passive, positioned (1) between a source of electromagnetic radiation, such as a visible beam of coherent light, and an output detector array, and (2) around an asymmetrical perimeter of a planar support body to develop an asymmetrically folded optical axis or path wholly within the body where the path is traversed by the beam SO THAT information processed by the active optical components along the optical path and imparted to the optical beam enable the optical detection of an unknown object at the detector array which is then subject to an identification process.

10 Claims, 2 Drawing Sheets

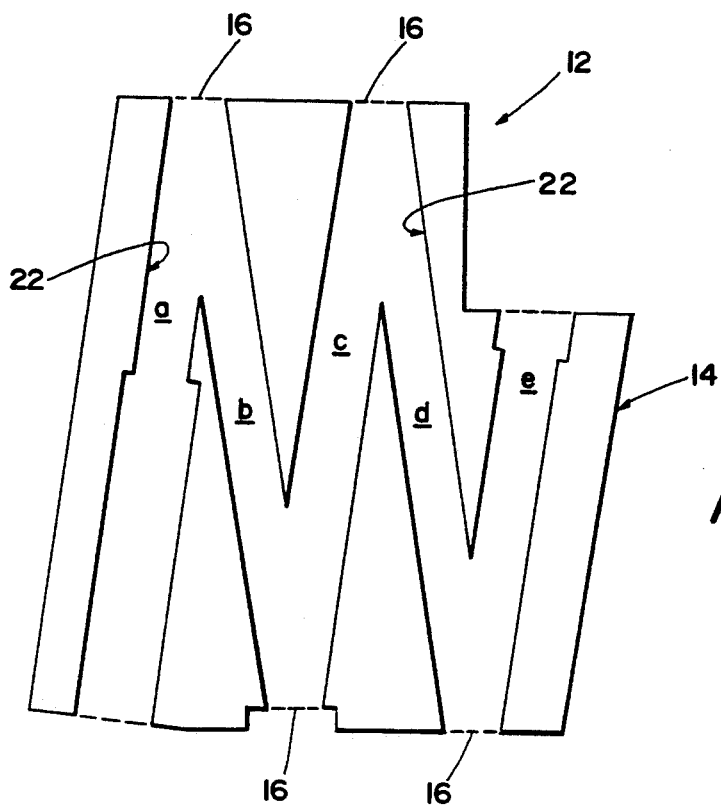
Fig. 2
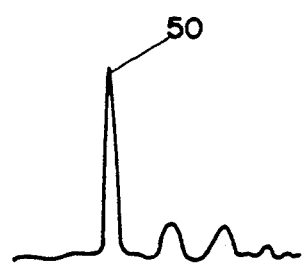
Fig. 5
Fig. 4
(PRIOR ART)
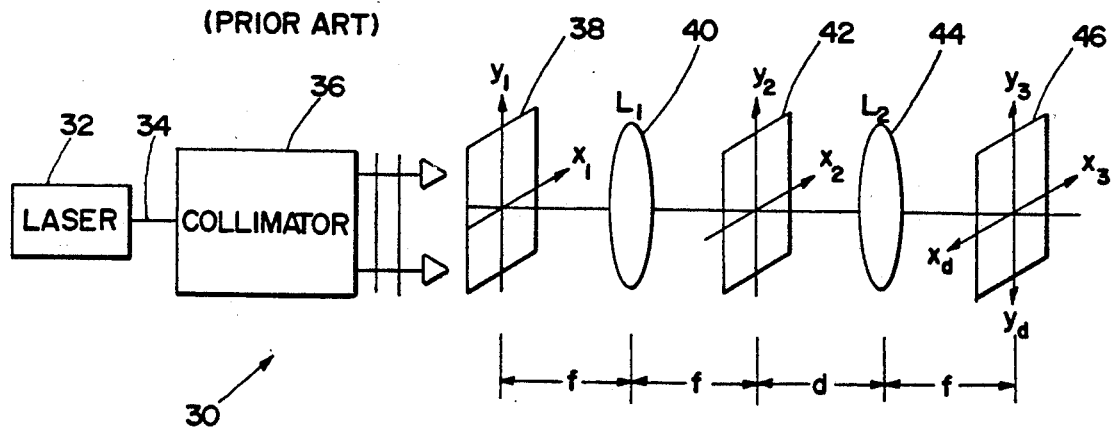

REFLECTIVE OPTICAL CORRELATOR WITH A FOLDED ASYMMETRICAL OPTICAL AXIS

COPYRIGHT MATERIAL

The disclosure of this patent contains material which is the subject of copyright protection. Reproduction of the patent document as it appears in the Patent and Trademark Office is permitted in furtherance of the United States Patent Laws (Title 35 United States Code). The copyright owner reserves all other rights under the United States Copyright Laws (Title 17 United States Code).

CROSS-REFERENCE TO RELATED APPLICATIONS

The invention described and claimed herein is related to U.S. patent application Ser. Nos. 07/867,422 and 07/867,423 which were both filed Apr. 13, 1992 and assigned to the same assignee herein.

BACKGROUND OF THE INVENTION

1. Field of the Invention

The invention is an optical correlator system having reflective optical components positioned along an asymmetrically folded optical axis or path between an electromagnetic radiation beam generator, which can be a laser that generates a beam of coherent light, and an output light detector for recognition of information processed along the optical path by active ones of the reflective optical components.

2. Description of the Related Art

Optical correlators can perform complex pattern recognition more rapidly than known digital techniques. Optical correlators are capable of processing large amounts of data in a data stream that can be useful in the detection, extraction and classification of desired information included in the data. Although known optical systems can perform extremely high speed, two-dimensional pattern recognition, their development has been hindered by the lack of suitable optical components; particularly at the input plane and at the spatial filter plane. However, the recent development of magneto-optic display assemblies (for example, see William E. Ross' U.S. Pat. No. 4,550,983, which is assigned to the same assignee) now provide a two-dimensional array of electronically programmable light shutters or valves that can be used to enter information into optical correlators at very high rates, e.g., at this time about 2000 frames per second. Such optical correlators can operate in, or nearly at, real-time. [See Mills and Ross, "Dynamic Magneto-optic Correlator: Real-time Operation", Society of Photo-Optical Instrumentation Engineers (SPIE) Acoustic-Optic, Electro-Optic and Magneto-Optic Devices and Applications (1987) vol. 753, pp 54–63.]

U.S. Pat. No. 5,148,496 by Robert H. Anderson, similarly assigned, teaches a discoid optical correlator system having reflective optical components positioned along a symmetrically folded optical axis or path between a source of light and an output light detector.

The discoid optical correlator system of Patent '496 has the folded optical path developed within a special disk. By definition, the disk is circular in shape and its perimeter or rim is regular. As a circle, its diameter D is the root in any determination of a folded optical path which is composed of one or more path segments (D, 2D,..nD). Therefore, each segment has a length determined by D, and each is of equal length as taught by this Patent. Also, the total length of the optical path and the number of its path segments in a folded configuration within the discoid is limited by its regular circumference or perimeter. This further determines the number of optical correlator components that can be positioned along the optical path.

The '496 Patent also teaches that the optical components are either active or passive. Its active optical components, excluding the laser diode and the charge coupled detector (CCD) array, are the input spatial light modulator (SLM) chip and the filter SLM chip. The passive components are the several concave and plane mirrors. These active and passive components are positioned along the symmetrical optical path between the laser diode and the CCD detector array in a sequence dictated by the disk diameter D which interposes passive optical components to link the active components. In the '496 Patent, the linear optical correlator path which is symmetrically folded within the discoid structure does not sequentially alternate and interpose the passive optical components in a desired active-passive-active-passive arrangement between a source of electromagnetic radiation and a detector array.

OBJECTS OF THE INVENTION

Accordingly, it is an object of the invention to provide a new improved optical correlator system having a folded asymmetrical axis or path.

It is an object of the invention to provide an optical correlator system having a folded asymmetrical optical path including unequal path segments.

It is an object of the invention to provide an optical correlator system that is able to withstand extreme environments such as wide temperature ranges and severe vibration levels.

It is an object of the invention to provide an optical correlator system that is able to withstand extreme acceleration and shock forces.

It is an object of the invention to provide an optical correlator system resistant to imposed centrifugal force.

It is an object of the invention to provide an optical correlator system having reflective optical components, both active and passive, arranged in an asymmetrical and folded optical path.

It is an object of the invention to provide a relatively small and lightweight optical correlator system with improved mechanical rigidity in various operating environments.

SUMMARY OF THE INVENTION

Briefly, in accordance with the invention, an optical correlator system is disclosed having a plurality of reflective optical components, a source of electromagnetic radiation, such as visible light, and an output detector which are positioned around an asymmetrical perimeter region of a planar body to develop an asymmetrical and folded or zigzag optical axis or path traversed by the beam of electromagnetic radiation so that an unknown object is optically detected which is then subject to a process of identification.

While the specification concludes with claims particularly pointing out and distinctly claiming the subject matter which may be regarded as the invention, the organization and method of operation, together with further objects, features, and the attending advantages thereof, may best be understood when the following

BRIEF DESCRIPTION OF THE DRAWING(S)

FIG. 2 is a plan view of a longitudinal cross section of a planar support body for the optical correlator system of FIG. 1.

FIG. 4 is a schematic of a PRIOR ART VanderLugt linear optical correlator system.

FIG. 5 is a graphical representation of an output waveform of an optical correlator system such as that of FIG. 1 and of FIG. 4.

DESCRIPTION OF THE INVENTION

Figure 1:
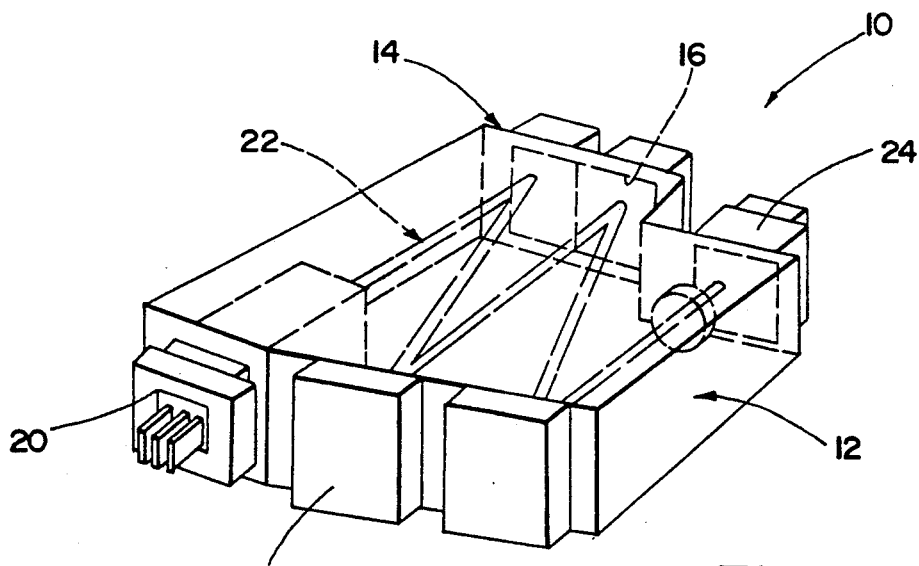
FIG. 1 is a perspective view of the optical correlator system with its asymmetrical reflective optical components as a preferred embodiment of the invention.

Referring to FIG. 1, a preferred embodiment of the reflective optical correlator system 10 of the present invention includes a planar support body 12 having an asymmetrical or irregular perimeter 14 with a plurality of system stations 16 formed at selected locations along the irregular perimeter of the support body. Respective ones of a plurality of reflective optical components 18, both active and passive, are positioned at selected and associated ones of the system stations. An electromagnetic radiation source 20 positioned at a system alpha station generates, for example, a coherent light beam which traverses a folded asymmetrical optical axis or path 22 developed within the planar body 12 and bounded or defined by the reflective optical components 18. The optical path 22 terminates at an array detector 24 positioned at a system omega station.

Figure 3:
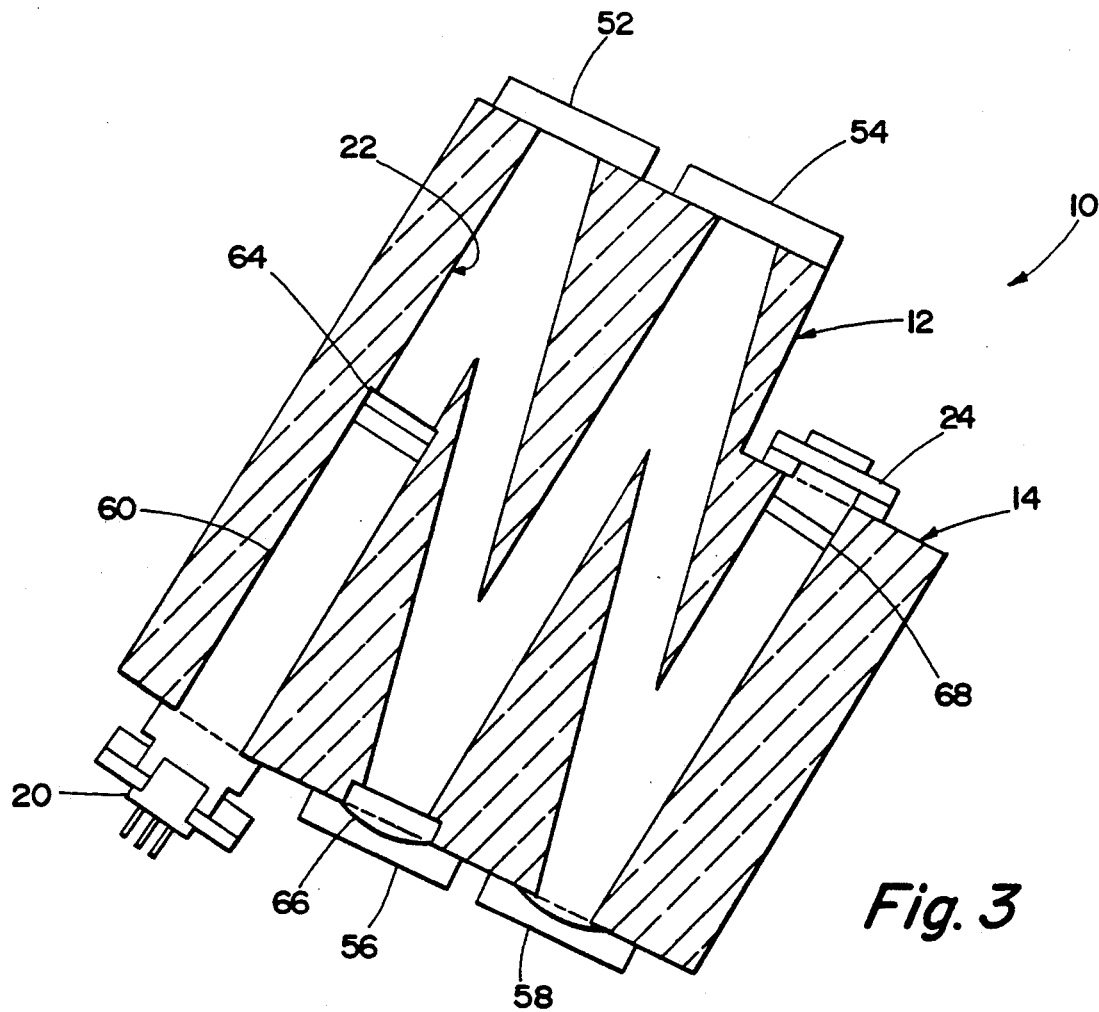
FIG. 3 is a longitudinal cross section of the optical correlator system of FIG. 1.

Referring now to FIGS. 2 and 3, the planar body 12 of the extremely compact reflective optical correlator system 10 of the invention is preferably formed from a Zerodur TM material which maintains all of the passive and active optical components in a fixed and stable configuration with respect to each other over various hostile environments such as vibration and temperature variations. Zerodur is a glass ceramic with the lowest temperature expansion coefficient of any presently known material ($7 \times 10^{-8}$ per °Centigrade) which provides maximum positional stability of all the active and passive components of the optical correlator system 10 relative to each other. Coupled with its excellent mechanical rigidity, Zerodur also has excellent machining and polishing properties.

As shown particularly by FIGS. 2 and 3, the asymmetrical folded or zigzag optical path 22 is formed by a series of ports or tunnels bored into and through the Zerodur material to provide a clear or material free optical path. Optical path 22 removes any degradation associated with the index-of-refraction changes, if any, of the Zerodur block 12. Such changes as caused by material inhomogeneities or temperature fluctuations would translate directly into intensity and phase changes across the beam and, hence, cause degradation. Furthermore, the clear optical path 22 eliminates interfaces between the optical block 12 and the active and passive components as listed above. Reflections from such interfaces could create interference with a light beam traversing the tunnel path 22, and distort its information bearing content as will be described. It is contemplated that in certain optical correlator systems, the clear optical path 22 could be evacuated and filled with an inert gas, such as helium, at a partial pressure to eliminate contaminants from the optical path, and to prevent possible chemical corrosion of the active and passive components.

The correlator body 12 can also be formed from a transparent, fused quartz ($SiO_2$). Because natural quartz which is birefringent can cause problems when used with a coherent or polarized light beam, fused quartz is considered to be preferred. It is contemplated that other materials such as glass, acrylic or similar clear plastic compositions could also be considered for use in forming the correlator support body 12.

The asymmetrical and folded optical path 22 that is formed within the Zerodur body 12 has several sequential path segments 22a through 22e as shown in particular by FIG. 2. As can be seen in FIG. 2, it is evident that the length of a path segment can be different from another path segment; for example, the length of path segment 22e is less than the length of path segment 22d. The length of path segment 22e is accurately determined by the size of the output correlator pattern traversing the optical path; in particular, from the last reflective component 18 to "paint" the array detector 24 so that its physical detector plane surface is maximized to record the output pattern. Yet it is also apparent that certain of the path segments, such as segments 22b and 22c, can have the same length. The asymmetry of the optical path and its total path length (the sum of the lengths of the individual segments) is determined by the required distances between the active and passive optical components. For the optical correlator system 10 of the invention, these sequentially joined path segments of selected same or differing lengths develop the folded, asymmetrical optical path 22.

The description herein of the optical correlator system 10 of the invention with its asymmetrical and zigzag folded optical path 22 should be considered and understood in view of a PRIOR ART VanderLugt linear optical correlator system 30 as shown by FIG. 4. A PRIOR ART VanderLugt linear optical correlator system is taught in greater detail by U.S. Pat. No. 5,148,496. This PRIOR ART linear optical correlator system 30 as shown by FIG. 4 has a laser 32 that develops a high intensity output beam 34 which is collimated through a collimator 36, and then expanded and focused by a suitable lens system onto an input spatial light modulator (SLM) 38. This input SLM 38 has a transmission function f(x,y) which represents an object to be identified. Lens 40 images the Fourier transform of f(x,y), F(u,v) onto a filter SLM 42 in the Fourier plane. The filter SLM 42 has a transmission function H(u,v), where H(u,v) is the Fourier transform of some function h(x,y). The optical field immediately downstream after the filter SLM 42 then is the product of F(u,v)H(u,v). A second lens 44 images the Fourier transform of this product onto a detector 46, and auto-correlation produces a bright spot in its detector plane.

The distance d from the filter SLM chip 42 to lens 44 is not critical to the operation of the PRIOR ART linear optical correlator system 30 of FIG. 4 since it affects neither the correlation intensity pattern nor the imaging condition from the input plane at SLM chip 38 to the detector plane at detector 46. Therefore, to detect and identify an object, its transmission function f(x,y) is correlated against a set of filters $H_1(u,v) \ldots H_n(u,v)$. Each of these filters is written onto the filter plane SLM 42 sequentially, and the correlation for each is obtained. The filter produces an auto-correlation peak, such as peak 50 of FIG. 5, at the detector plane of detector 46 that indicates the location of the object and permits its identification.

Accordingly, the optical correlator system 10 of the invention as shown by FIGS. 1 through 3 depends on the folding of a linear optical axis or path, like that of the above PRIOR ART linear optical correlator system 30 of FIG. 4, into the asymmetrical and zigzag folded optical path 22 as shown.

Referring now to FIG. 3, the reflective optical correlator system 10 of the invention includes both active and passive optical components or elements as follows:
1. Active elements:
   electromagnetic radiation source 20,
   input spatial light modulator (SLM) 52,
   filter SLM 54, and
   array detector 24.
2. Passive elements:
   planar support body 12,
   reflective toric mirrors 56 and 58,
   unit 60 that includes (1) a collimator, which is an assembly of several lenses, and (2) a Gaussian intensity filter; and, polarizers 64, 66 and 68.

The electromagnetic radiation source 20 of coherent visible light is a conventional diode laser positioned at the alpha station of the optical correlator system 10. One visible diode laser has a 685 mm wavelength with an optical output power of 20 mW. Such a laser develops a high intensity output beam that is collimated and filtered by unit 60. The collimator portion of unit 60 corrects for astigmatism and output beam ellipticity, and produces a round, collimated beam; here, the beam exits the unit 60 with an approximate 6 mm Gaussian diameter. Since the input SLM 52 is preferably illuminated by a plane wave with uniform intensity, a Gaussian intensity filter portion of unit 60 cooperates with the collimator portion. The filter has a Gaussian absorption profile so that the exiting filtered beam has an intensity which is uniform over 6 mm.

The input SLM 52 is an electrically addressable magneto-optic chip that operates in a reflective mode. One such magneto-optic SLM or MOSLM TM chip is the subject of the above listed related applications. These MOSLM chips are available from the Data Systems Division of Litton Systems, Inc., Agoura Hills, Calif. This input SLM 52 is a MOSLM chip having a 128×128 pixel array with pixel-to-pixel spacing of 24 microns (22 microns pixels with a 2 micron gap between pixels that are organized in rows and columns; the active area is a square measuring 3.1 mm on a side).

The filter SLM 54 is structurally identical to but functionally different from the input SLM 52.

Three polarizers 64, 66 and 68 are used in the optical path 22 of the optical correlator system 10 of the invention. These polarizers are made of a dichroic film coated onto the surface of an optical flat. Each has a high extinction ratio (for example, 2000:1) and a high parallel transmission coefficient (for example, over 80 percent). Since each of the SLM chips 52 and 54 has an array of pixels which, in accordance with the Faraday effect, selectively rotate incoming linearly polarized light, then each SLM chip requires an entrance polarizer and an exit polarizer which functions as an analyzer. Polarizer 64 is positioned in the optical path 22 between the collimator-filter unit 60 and the input SLM 52 to affect the exiting collimated and filtered beam exiting from the unit 60. The second polarizer 66 is positioned to intercept the light beam traversing the optical path 22 as it passes to and is reflected from toric mirror 56. The polarizer 66 functions as the input SLM 52 exit analyzer, and correspondingly as the filter SLM 54 entrance polarizer. Polarizer 68 is positioned just prior to the array detector 24.

As passive components or elements, mirrors 56 and 58 function to produce the first and second Fourier transforms. Since astigmatism is a concern in such optical systems for Fourier transforms, the mirror surfaces are not spherical in the optical correlator system 10 of the invention. The concave mirror surface of each mirror 56 and 58 is toric. By definition, a toric mirror has a segment of an equilateral zone of a torus which results in different refracting power in different meridians. That is, each toric mirror has two radii of curvature where the radius of curvature with respect to the meridional plane differs from that along the sagittal plane; here in the optical correlator system 10 this difference is about two percent (2%). These toric surfaces take into account the incidence angle of the optical beam, and correct for optical aberrations that would be produced if the mirror surface were a spherical surface illuminated at this incidence angle. Stated another way, the toric correction depends on the particular incidence angle.

In the optical correlator system 10 of the invention as shown by FIG. 3, the focal length of mirror 56 is determined by $$f_1 = N_f P_f P_i / \lambda n \qquad (1)$$

where $N_f = 128$ which is determined by the use of a 128×128 input SLM 52 and a 128×128 filter SLM 54 with pixel spacing $P_i = 24$ microns and $P_f = 24$ microns, respectively. Lambda is equal to the laser wavelength, and n is equal to the refractive index of the medium with air = 1. The focal length $f_2$ of mirror 58 is determined by the desired magnification of the system.

In one optical correlator system 10 of the invention, the selected magnification for the system is ⅔ which matches the correlation size of the particular array detector 24. Therefore, in this system, $f_2 = ⅔ f_1$ where $f_1 = 107.7$ mm, and $f_2 = 71.75$ mm. Using a predetermined 8° incidence angle in this system, then the radii of curvature for the toric mirrors 56 and 58 are:
Mirror 56: $R_m = 215.26$, $R_s = 219.54$
Mirror 58 $R_m = 143.51$, $R_s = 146.36$
where subscript s = Sagittal (the plane of FIG. 3), and subscript m = Meidional (the plane perpendicular to the plane of FIG. 3).

The toric mirrors 56 and 58 used in the optical correlator system 10 of the invention as shown by FIG. 3 can be fabricated from high quality mirror substrate materials such as Zerodur glass. Zerodur substrates are highly polishable and exhibit very low thermal expansion; both important qualities for mirror substrates. Dielectric coatings can be used for high reflection and durability.

Continuing with the optical correlator system 10, the array detector 24 in the preferred embodiment of the system is a charge coupled device (CCD) positioned at the optical correlator output plane detector or omega station as a frame transfer device. In the optical correlator system 10 as described above, the CCD detector 24 has a 128×128 pixel array. Again, this pixel array is oriented in rows and columns like the pixel array of input SLM 52 and filter SLM 54. However, the CCD detector pixel array has a 16 micron pixel size and a 4 mm² active imaging area. The planar surface of the CCD detector 24 is positioned parallel to the plane defined by the planar reflective surfaces of the input SLM 52 and the filter SLM 54. It is contemplated that in certain operational systems, the CCD detector could be positioned at an angle equal to a predetermined angle as measured in degrees from the axis of the optical path as determined by the sphericity of the preceding toric mirror. This would permit the optical beam reflected by the toric mirror to "paint the best picture" on the pixel array of the CCD detector 24.

The linear distance of optical path segment 22e (see FIG. 2) between the toric mirror 58 and the CCD array 24 as has been described is determined by the comparative difference between the 24 micron pixel size for both pixel arrays of the input SLM 52 and the filter SLM 54, and the 16 micron pixel size of the pixel array for CCD detector 24. Although the length of path segment 20a is different than that of path segment 20e, it is contemplated that there will be embodiments of the optical correlator system 10 of the invention where these path segments could be of equal or nearly equal length. Lastly, in this embodiment of the optical correlator system 10 of the invention, the CCD array 24 has a 3000:1 dynamic range, although this is not considered to be critical to the operation of the system, and a 6 MHz output data rate.

Relative positional stability of the active and passive components attached to the planar support body 12 is a key factor in proper optical correlator operation. Why? because the most severe requirement of the optical correlator system 10 is the faithful mapping of the information content of the optical beam from an input pixel on the input SLM 42 onto the corresponding filter pixel on the filter SLM 54. For this primary reason then, the seal utilized for the active and passive components must ensure the positional stability of all the components with respect to the Zerodur planar support body 12. This has primary importance particularly under operating environments having a wide range of temperatures and vibration levels; as well as those of extreme acceleration and shock imposed forces. In one embodiment, rigid mounting of the active components is accomplished through the use of alumina ($Al_2O_3$) for the input SLM 52 and filter SLM 54, and Kovar (a registered trademark) for the CCD array 24. This maximizes the seal positional stability and reliability without an adverse affect on the magnetic field associated with each MOSLM SLM. The passive components can be either formed in place or attached to the Zerodur block using epoxy or similar organic adhesives or materials.

As will be evidenced from the foregoing description, certain aspects of the invention are not limited to the particular details of construction as illustrated, and it is contemplated that other modification and applications will occur to these skilled in the art. It is, therefore, intended that the appended claims shall cover such modifications and applications that do not depart from the true spirit and scope of the invention.

We claim:

1. An optical correlator system for the detection and identification of an unknown object where the object is represented at an input station of the system, imaged at a subsequent filter station in a Fourier transform plane, then detected and identified at a subsequent detector station CHARACTERIZED IN THAT the optical correlator system comprises:

a) system support means having an asymmetrical perimeter region that defines a number (n) of system stations non-uniformally spaced apart along said asymmetrical perimeter, b) respective ones of a plurality of reflective optical component means positioned at selected and associated ones of a number (n-2) of said system stations, and a plurality of transmissive optical component means positioned between selected ones of said (n) system stations, all to affect a beam of electromagnetic radiation impinging thereon and passing therethrough respectively, c) said reflective optical component means include an input means positioned at the input station of the system and a filter means positioned at the filter station of the system where said input means is responsive to an input signal representing an unknown object, and said filter means is responsive to the Fourier transform output of said input means, and both said input means and said filter means impart selected information to said beam of electromagnetic radiation, d) electromagnetic radiation source means positioned at a first or alpha one of said non-selected system stations generating said beam of electromagnetic radiation, and e) electromagnetic radiation detector means positioned at a last or omega remaining one of said non-selected system stations and being responsive to said resulting beam of electromagnetic radiation subsequent to all of said reflective and transmissive optical component means effect on said beam of electromagnetic radiation, f) said source means, reflective optical component means, and said detector means define the boundaries of a folded optical path developed wholly within said support means and traversed by said beam of electromagnetic radiation SO THAT the unknown object is optically detected and identified.

2. The optical correlator system of claim 1 in which said input means and said filter means are active components.

3. The optical correlator system of claim 2 in which said input means is an input spatial light modulator (SLM) and said filter means is a filter SLM.

4. The optical correlator system of claim 1 in which said detector means is a charge coupled device having a detector face.

5. The optical correlator system of claim 1 in which said support means is a solid body having at least one tunnel bored between sequentially adjacent ones of said stations.

6. The optical correlator system of claim 5 in which said optical path is coextensive with each port between and interconnecting said sequentially adjacent ones of said stations SO THAT said optical path thereby developed is folded and generally zigzag in geometric configuration.

7. The optical correlator of claim 6 in which said optical path includes a plurality of linear path segments sequentially aligned in said folded zigzag optical path wherein selected ones of said linear path segments have a finite length greater than nonselected ones of said linar path segments SO THAT said folded optical path is asymmetrical.

8. An optical correlator system for the detection of an unknown object where the object is represented at an input station of the system, imaged at a subsequent filter station in a Fourier transform plane, then detected and subject to identification at a terminus detector station CHARACTERIZED IN THAT the optical correlator system comprises:

a) system support means having an asymmetrical perimeter region that defines a number (n) of system stations which are non-uniformally spaced apart along said perimeter, b) a coherent light source positioned at an initial one of said stations, c) a second station in linear opposition to and spaced apart from said light source, d) a first light path segment formed in said system support means between said light source and said second station, e) a reflective input spatial light modulator positioned at said second station, f) a first toric reflective surface positioned at a third station in linear opposition to and spaced apart form said input spatial light modulator, g) a second light path segment formed in said system support means between said input spatial light modulator and said first toric reflective surface, h) a fourth station in linear opposition to and spaced apart from said a toric reflective surface, i) a reflective filter spatial light modulator positioned at said fourth station, j) a third light path segment formed in said support means between said toric reflective surface and said filter spatial light modulator, k) a second toric reflective surface positioned at a fifth station in linear opposition to and spaced apart from said filter spatial light modulator, l) a fourth light path segment formed in said support means between said filter spatial light modulator and said second toric reflective surface, m) a charge coupled detector positioned at a sixth station in linear opposition to and spaced apart from said second toric reflective surface, n) a fifth light path segment formed in said system support means between said second toric reflective surface and said detector, o) said first through said fifth light path segments forming a folded asymmetrical optical axis or path which is zigzag in configuration and wholly contained within said system support means where each of said first and fifth light path segments are in linear dimension less than at least one of said second through fourth light path segments, p) a first polarizer positioned between said coherent light source and said reflective input spatial light modulator to intercept and selectively rotate said first light path segment in the transmissive mode, q) a second polarizer positioned adjacent said first toric reflective surface to intercept and selectively rotate both of said second and third light path segments in the transmissive mode, and r) a third polarizer positioned between said second toric reflective surface and said detector to intercept and selectively rotate said fifth light path segment in the transmissive mode SO THAT the unknown object is optically detected and thereby subject to a process for identification.

9. The optical correlator system of claim 8 in which said second station is the input plane and said fourth station is the filter plane for the identification of at least one unknown input through optical correlation of the input plane with a plurality of known filters at the filter plane in a Fourier transform.

10. The optical correlator system of claim 8 in which said second polarizer is positioned at said third station between said first toric reflective surface and each of said input spatial light modulator and said filter spatial light modulator to intercept said second and third light path segments both in the transmissive mode.

* * * * *